(12) United States Patent
Kim et al.

(10) Patent No.: US 10,516,160 B2
(45) Date of Patent: Dec. 24, 2019

(54) ELECTRODE FOR LITHIUM SECONDARY BATTERY AND LITHIUM SECONDARY BATTERY INCLUDING THE SAME

(71) Applicant: LG Chem, Ltd., Seoul (KR)

(72) Inventors: Seul Ki Kim, Daejeon (KR); Jong Heon Seol, Daejeon (KR); Hee Soo Na, Daejeon (KR); Chan Sub Lee, Daejeon (KR); Hyung Suk Cho, Daejeon (KR); Jung Keun Yoo, Daejeon (KR); Je Young Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 162 days.

(21) Appl. No.: 15/700,768

(22) Filed: Sep. 11, 2017

(65) Prior Publication Data
US 2018/0076451 A1   Mar. 15, 2018

(30) Foreign Application Priority Data
Sep. 9, 2016   (KR) .................. 10-2016-0116635

(51) Int. Cl.
| | |
|---|---|
| *H01M 4/36* | (2006.01) |
| *H01M 4/62* | (2006.01) |
| *H01M 10/0525* | (2010.01) |
| *H01M 4/13* | (2010.01) |
| *H01M 4/66* | (2006.01) |
| *H01M 4/02* | (2006.01) |
| *H01M 10/052* | (2010.01) |

(52) U.S. Cl.
CPC ............. *H01M 4/366* (2013.01); *H01M 4/13* (2013.01); *H01M 4/62* (2013.01); *H01M 4/625* (2013.01); *H01M 4/667* (2013.01); *H01M 4/668* (2013.01); *H01M 10/0525* (2013.01); *H01M 10/052* (2013.01); *H01M 2004/021* (2013.01)

(58) Field of Classification Search
CPC ....... H01M 4/366; H01M 4/623; H01M 4/667
USPC ............................................ 429/218.1
See application file for complete search history.

(56) References Cited

U.S. PATENT DOCUMENTS

| | | | |
|---|---|---|---|
| 9,379,387 | B2 | 6/2016 | Jung et al. |
| 2010/0273052 | A1 | 10/2010 | Sakitani et al. |

(Continued)

FOREIGN PATENT DOCUMENTS

| | | |
|---|---|---|
| KR | 10-2003-0033595 A | 5/2003 |
| KR | 10-0582518 B1 | 5/2006 |

(Continued)

*Primary Examiner* — Basia A Ridley
*Assistant Examiner* — James M Erwin
(74) *Attorney, Agent, or Firm* — Mintz Levin Cohn Ferris Glovsky and Popeo, P.C.; Jhongwoo Peck (57) ABSTRACT

An electrode for a lithium secondary battery includes a current collector, primer layer formed on a side of the current collector and includes a first conductive agent, a first binder and a first dispersant. Further, an active material layer is formed on a side of the primer layer disposed opposite to the current collector and includes an active material. Additionally, the lithium secondary battery includes a positive electrode, a negative electrode or both, a separator disposed between the positive electrode and the negative electrode and an electrolyte. The structural stability and adhesion of the electrode is improved, a ratio of a binder in the active material layer is reduced and the internal resistance is reduced.

11 Claims, 5 Drawing Sheets

(56) References Cited

U.S. PATENT DOCUMENTS

| | | | | |
|---|---|---|---|---|
| 2013/0143126 A1* | 6/2013 | Jung | ............... | H01B 1/122 |
| | | | | 429/231.6 |
| 2015/0228971 A1* | 8/2015 | Kim | ............ | H01M 10/0525 |
| | | | | 429/223 |
| 2015/0280237 A1* | 10/2015 | Mukai | ............... | H01M 4/136 |
| | | | | 252/506 |

FOREIGN PATENT DOCUMENTS

| KR | 10-2010-0112127 A | 10/2010 |
|---|---|---|
| KR | 10-2012-0014542 A | 2/2012 |

* cited by examiner

ELECTRODE FOR LITHIUM SECONDARY BATTERY AND LITHIUM SECONDARY BATTERY INCLUDING THE SAME

CROSS-REFERENCE TO RELATED APPLICATION

This application claims priority to and the benefit of Korean Application No. 10-2016-0116635 filed on Sep. 9, 2016, which application is incorporated herein by reference.

TECHNICAL FIELD

The present disclosure relates to an electrode for a lithium secondary battery and more particular to a primer layer disposed between a current collector and an active material layer, having improved structural stability and adhesion and minimal internal resistance and a lithium secondary battery including the electrode.

RELATED ART

Demand for secondary batteries as an energy source has increased significantly as technology development and demand for mobile devices has increased. In particular, among secondary batteries, lithium secondary batteries that have high energy density and operating potential and low self-discharging rate have been commercialized and widely used. Generally, lithium secondary batteries utilize a lithium transition metal oxide as a positive electrode active material and a graphite-based material as a negative electrode active material. The charge and discharge of the lithium secondary battery is performed while a process of intercalating and deintercalating lithium ions from a positive electrode into and out of a negative electrode is repeated.

Typically, although there is a difference in theoretical capacity of the battery according to the type of electrode active materials, charge and discharge capacities may be reduced as cycles proceed. The most significant cause of the degradation is that the active material does not fully function due to an increase in internal resistance while separation between an electrode active material or separation between the electrode active material and a current collector occurs due to changes in volume of the electrode occurring during the charge and discharge of the battery. Additionally, when the lithium ions intercalated into the negative electrode are not properly deintercalated during intercalation and deintercalation, active points of the negative electrode are reduced. Accordingly, the charge and discharge capacities and life characteristics of the battery may also be reduced as the cycles proceed.

In particular, when natural graphite having a theoretical discharge capacity of 372 mAh/g is mixed with a material with high discharge capacity, (e.g., silicon, tin, a silicon-tin alloy, or a silicon-carbon composite material or the link), to increase the discharge capacity, volume expansion of the material is significantly increased as the charge and discharge proceed. Accordingly, as a result, the electrode active material is separated from the current collector to eventually cause rapid reduction of the capacity of the battery during multiple cycles. In other words, a technique capable of achieving structural stability of the electrode and improving the performance of the battery by controlling the current collector and the electrode active material to be inseparable from each other during the repeated charge and discharge is required.

For example, a method for improving adhesion by controlling a binder has been proposed. In the related art polyvinylidene fluoride and a styrene-butadiene rubber are mixed at a predetermined ratio and used as a binder. See Korean Patent Application Publication No. 2003-0033595. Furthermore, the composite polymer particles, in which two or more polymers having different chemical structures form a heterogeneous structure is used as a binder. See Korean Patent No. 0582518. However, despite various technical proposals, there is still a need to develop a technique capable of improving physical properties, such as cycle characteristics of the battery, by improving the structural stability and adhesion of the battery.

The above information disclosed in this section is merely for enhancement of understanding of the background of the disclosure and therefore it may contain information that does not form the prior art that is already known in this country to a person of ordinary skill in the art.

SUMMARY

An aspect of the present disclosure provides an electrode for a lithium secondary battery that may include a primer layer disposed between a current collector and an active material layer, in which structural stability and adhesion may be improved and internal resistance may be reduced. Another aspect of the present disclosure provides a lithium secondary battery that may include the electrode to provide improved discharge capacity characteristics.

According to an aspect of the present disclosure, an electrode for a lithium secondary battery may include a current collector, a primer layer formed on at least one side of the current collector and a first conductive agent, a first binder, and a first dispersant and an active material layer formed on a side of the primary layer disposed opposite to the current collector and includes an active material. The primer layer and the active material may be calculated by an equation:

$$-2.2 \leq R_z - D_{50}/2 \leq 2.2$$

In the equation, $R_z$ may represent a surface roughness of the primer layer that abuts the active material layer and $D_{50}$ may represent an average particle diameter of the active material In some exemplary embodiments, the electrode for a lithium secondary battery of may include the primer layer having the first conductive agent formed by 100 parts by weight, the first dispersant formed by 5 parts by weight to 20 parts by weight based on 100 parts by weight of the first conductive agent, and the first binder formed by 60 parts by weight to 250 parts by weight based on 100 parts by weight of the first conductive agent. In another exemplary embodiment, the primer layer may include the first conductive agent, the first dispersant and the first binder having a weight ratio of about 1:0.05 to 0.15:0.6 to 1.8.

In other exemplary embodiments, the electrode for a lithium secondary battery of may include the first conductive agent having a carbon black having a particle diameter in the range of about 0.037 μm to about 0.045 μm and a specific surface area of about 53 m$^2$/g to about 58 m$^2$/g, or a mixture of a flaky graphite having a particle diameter of about 6.3 μm to about 6.5 μm and a specific surface area of about 8.5 m$^2$/g to about 10 m$^2$/g and the carbon black. The mixture may include the carbon black and the flaky graphite in a weight ratio of about 8:2 to about 9:1.

In another exemplary embodiment, the electrode for a lithium secondary battery of may include the first dispersant having one selected from carboxymethylcellulose and a carboxymethylcellulose salt, or both. The carboxymethylcellulose salt may include one selected from a carboxymethylcellulose ammonium salt and a carboxymethylcellulose sodium salt, or both.

Additionally, in some exemplary embodiments, the electrode for a lithium secondary battery may include the primer layer having a thickness of about 0.5 µm to about 1 µm. The electrode for a lithium secondary battery may include the electrode having an adhesion of about 15 gf/15 mm to about 25 gf/15 mm.

According to another aspect of the present disclosure, a lithium secondary battery may include the electrode having a positive electrode, a negative electrode, or both, a separator disposed between the positive electrode and the negative electrode and an electrolyte.

The above and other aspects and embodiments of the present invention are described in more detail below.

BRIEF DESCRIPTION OF THE DRAWINGS

The following drawings attached to the specification illustrate exemplary examples of the present disclosure, and serve to enable technical concepts of the present disclosure to be further understood together with detailed description of the disclosure given below, and therefore the present disclosure should not be interpreted only with matters in such drawings.

DETAILED DESCRIPTION

Hereinafter, exemplary embodiments of the present disclosure will be described below in more detail with reference to the accompanying drawings. The present disclosure may, however, be embodied in different forms and should not be construed as limited to the exemplary embodiments set forth herein. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second elements could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure, based on the principle that an inventor may properly define the meaning of the words or terms to best explain the disclosure.

The present disclosure provides an electrode for a lithium secondary battery having improved structural stability and adhesion. The electrode for a lithium secondary battery according to an exemplary embodiment of the present disclosure may include a current collector, a primer layer having a conductive agent, a binder, and a dispersant and formed on a side (e.g., at least one side) of the current collector and an active material layer that contains an active material and formed on a side (e.g., one side or a first side) of the primer layer disposed opposite to the current collector.

Additionally, the electrode may be calculated by the equation (e.g., equation 1) as shown below.

$$-2.2 \leq R_z - D_{50}/2 \leq 2.2 \qquad \text{Equation 1:}$$

In particular, $R_z$ may represent a surface roughness of the primer layer that abuts (e.g., in contact) with the active material layer and $D_{50}$ may represent an average particle diameter of the active material. Additionally, the electrode may be used as a positive electrode or a negative electrode. In the present disclosure, the surface roughness ($R_z$) may be calculated by the equation (e.g., equation 2) shown below.

$$\text{Surface roughness } (R_z) = (R_p + R_v)/5 \qquad \text{Equation 2:}$$

In particular, $R_p$ may represent a sum (e.g., absolute value) of distances from the center line to the farthest 5 points upwards in a Topo image. Additionally, $R_v$ may be a sum (e.g., absolute value) of distances from the center line to the farthest 5 points downwards in the Topo image. The Topo image may be obtained by a NanoView instrument. Further, a surface of the primer layer may be measured at a magnification of 500×. The Topo image may be calculated by selecting 5 measurement areas. Namely, the measurements may be made within a range of 20 μm above and below a reference plane, and linear recovery and triangle recovery may be performed.

In the present disclosure, the average particle diameter ($D_{50}$) of the active material represents a particle diameter at about 50% in a cumulative particle diameter distribution of the measured active material that may be measured by a laser diffraction method. Specifically, particles of the active material may be dispersed in an aqueous solution including sodium hexametaphosphate [$(NaPO_3)_6$]. The aqueous solution may be irradiated with ultrasonic waves having a frequency of about 28 kHz and an output of about 60 W using a laser diffraction particle size analyzer and the particle diameter at about 50% in a particle diameter distribution may be measured and calculated.

Figure 1:
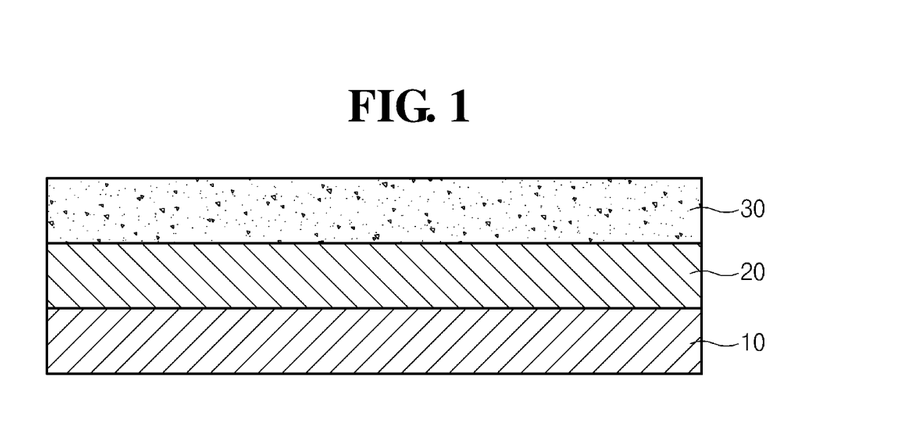
FIG. 1 is an exemplary cross sectional view of a structure of an electrode according to an exemplary embodiment of the present disclosure.
Figure 2:
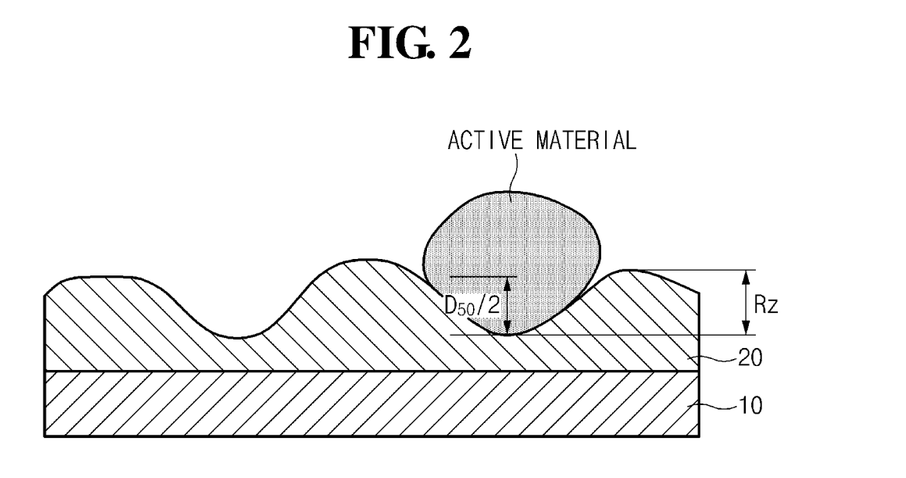
FIG. 2 is an exemplary cross sectional view of a bonding surface of a primer layer 20 and an active material layer 30 in the electrode according to the exemplary embodiment of the present disclosure.

Hereinafter, the electrode according to the exemplary embodiment of the present disclosure will be described in detail with reference to FIGS. 1 and 2. FIG. 1 illustrates an exemplary cross section of a structure of the electrode according to the exemplary embodiment of the present disclosure. FIG. 2 illustrates an exemplary bonding surface of a primer layer and an active material layer. As illustrated in FIG. 1, the electrode according to the exemplary embodiment of the present disclosure may have a structure that includes a current collector 10, a primer layer 20 and an active material layer 30. The primer layer 20 may be disposed between the current collector 10 and the active material layer 30. Additionally, the primer layer 20 may be formed on a side (e.g., at least one side) of the current collector 10. In an exemplary embodiment, the electrode may have a structure that includes a current collector, primer layers disposed (e.g., formed) on multiple (e.g., both sides) of the current collector and an active material layer disposed (e.g., formed) on each of the primer layers.

The current collector 10 may have a high conductivity without causing adverse chemical changes in the battery. For example, copper, stainless steel, aluminum, nickel, titanium, fired carbon, or aluminum or stainless steel that is surface-treated with one of carbon, nickel, titanium, or silver may be used. Additionally, the current collector 10 may t have a thickness of about 3 μm to about 500 μm. The primer layer 20 may be an adhesive layer disposed between the current collector 10 and the active material layer 30 and may include a first conductive agent, a first binder, and a first dispersant.

Specifically, the primer layer 20 may include about 100 parts by weight of the first conductive agent, about 5 parts by weight to about 20 parts by weight of the first dispersant based on 100 parts by weight of the first conductive agent; and about 60 parts by weight to about 250 parts by weight of the first binder based on 100 parts by weight of the first conductive agent. Particularly, the primer layer 20 may include the first conductive agent, the first dispersant and the first binder in a weight ratio of 1:0.05 to 0.15:0.6 to 1.8. More particularly, the primer layer 20 may include the first conductive agent, the first dispersant and the first binder in a weight ratio of 1:0.08 to 0.12:0.7 to 1.5.

The primer layer 20 according to an exemplary embodiment of the present disclosure may include the first conductive agent, the first binder and the first dispersant at the above-described ratio and the surface roughness ($R_z$) may have a magnitude similar to a half of the average particle diameter ($D_{50}/2$) of the active material in the active material layer 30 as illustrated in FIG. 2. In other words, when the primer layer 20 includes the first conductive agent, the first binder and the first dispersant at the above-described ratio, the primer layer 20 may have the surface roughness ($R_z$) that may satisfy Equation 1. Accordingly, a contact area between the primer layer 20 and the active material layer 30 may be increased. As a result, the structural stability and adhesion of the electrode including the primer layer 20 and the active material layer 30 may be improved.

The first conductive agent is not particularly limited provided that side reactions with other elements of the battery do not occur and has characteristics that may satisfy Equation 1 while having conductivity. In particular, the first conductive agent may be carbon black having an average particle diameter of about 0.037 μm to about 0.045 μm and a specific surface area of about 53 m²/g to about 58 m²/g. Alternative the first conductive agent may be a mixture of flaky graphite having an average particle diameter of about 6.3 μm to about 6.5 μm and a specific surface area of about 8.5 m²/g to about 10 m²/g and the carbon black. In other words, the mixture may include the carbon black and the flaky graphite in a weight ratio of 8:2 to 9:1. The carbon black is not particularly limited as long as it has the above-described average particle diameter and specific surface area. For example, in some exemplary embodiments, the carbon black, may be acetylene black, Ketjen black, channel black, furnace black, lamp black, or thermal black, and one thereof or a combination of two or more thereof may be used.

The flaky graphite may be artificial graphite or natural graphite having a flaky shape, or a combination thereof. Further, the flaky shape may be a shape having a long axis and a short axis and represents a shape that is not perfectly spherical. The flaky shape may include a scale shape, a scale fragment shape, a chunk shape, a plate shape, and a tablet shape or the like.

In the present disclosure, the specific surface area may be measured by a nitrogen gas adsorption Brunauer, Emmett & Teller (e.g., BET) method. The specific surface area may be measured by a 6-point BET method according to a nitrogen gas adsorption-flow method using a Belsorp-II mini porosimetry analyzer. Additionally, the average particle diameter of the first conductive agent in the present disclosure may be measured by the same method as described above.

The first binder, as a component that assists the adhesion to the current collector, is not particularly limited and may include at least one selected from the group consisting of a polyvinylidene fluoride-hexafluoropropylene copolymer (PVDF-co-HEP), polyvinylidene fluoride, polyacrylonitrile, polymethylmethacrylate, polyvinyl alcohol, starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), and a fluorine rubber. In particular, the first binder may be a styrene-butadiene rubber.

The first dispersant may be at least one selected from carboxymethylcellulose and a carboxymethylcellulose salt and may be a carboxymethylcellulose salt. The carboxymethylcellulose salt may be at least one selected from a carboxymethylcellulose ammonium salt and a carboxymethylcellulose sodium salt. The carboxymethylcellulose salt may be a carboxymethylcellulose ammonium salt. Additionally, the primer layer 20 is not particularly limited, but may have a thickness of about 0.2 μm to about 2 μm. In particular, the primer layer 20 may have a thickness of about 0.5 μm to about 1 μm.

Furthermore, the active material layer 30 may include an active material. The active material may be appropriately selected according to the purpose and used without particular limitation provided the active material includes an average particle diameter that satisfies Equation 1. Specifically, the active material may be different based on the use of the electrode. For example, when the electrode is used as a positive electrode, the active material may be a positive electrode active material and when the electrode is used as a negative electrode, the active material may be a negative electrode active material.

The positive electrode active material is not limited and may include a manganese-based spinel active material, lithium metal oxide, or a mixture thereof. The lithium metal oxide may include lithium-manganese-based oxide, lithium-nickel-manganese-based oxide, lithium-manganese-cobalt-based oxide, and lithium-nickel-manganese-cobalt-based oxide. The positive electrode active material may include $LiCoO_2$, $LiNiO_2$, $LiMnO_2$, $LiMn_2O_4$, $Li(Ni_aCo_bMn_c)O_2$ (where $0<a<1$, $0<b<2$, $0<c<1$, and $a+b+c=1$), $LiNi_{1-y}Co_yO_2$, $LiCo_{1-y}Mn_yO_2$, $LiNi_{1-y}Mn_yO_2$ (where $0 \leq y<1$), $Li(Ni_dCo_eMn_f)O_4$ (where $0<d<2$, $0<e<2$, $0<f<2$, and $d+e+f=2$), $LiMn_{2-z}Ni_zO_4$, and $LiMn_{2-z}Co_zO_4$ (where $0<z<2$).

The negative electrode active material is not limited and may include a carbon material capable of intercalating and deintercalating lithium ions, lithium metal, silicon, tin or the like. The carbon material may include low crystalline carbon and high crystalline carbon. Namely, examples of the low crystalline carbon may be soft carbon and hard carbon. Additionally, examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The active material layer 30 may further include a second conductive agent, a second binder, and a second dispersant in addition to the above-described active material. The second conductive agent is not limited and may be one commonly used in the art. In other words, the second conductive agent may include conductive materials such as graphite (e.g., natural graphite or artificial graphite), carbon black (e.g., super-p, acetylene black, Ketjen black, channel black, furnace black, lamp black, and thermal black), conductive fibers (e.g., carbon fibers and metal fibers), metal powder (e.g., fluorocarbon powder, aluminum powder, and nickel powder) conductive whiskers (e.g., zinc oxide whiskers and potassium titanate whiskers) and a conductive metal oxide (e.g., titanium oxide; or polyphenylene derivatives). The second conductive agent may be included in an amount of about 0.05 wt % to about 10 wt % based on a total weight of the active material.

The second binder is not limited and may be one commonly used in the art. For example, the second binder may be the same as the first binder included in the above-described primer layer 20 or may be one included in the first binder. The second binder may be included in an amount of about 1 wt % to about 30 wt %, particularly, about 1 wt % to about 10 wt % based on the total weight of the active material. For example, the second binder may be included in an amount of about 1 wt % to about 5 wt % based on the total weight of the active material in the active material layer 30.

In the electrode according to the present disclosure, when the primer layer 20 and the active material satisfy the above-described Equation 1, adhesion between the primer layer 20 and the active material layer 30 may be achieved. Accordingly, sufficient adhesion may be obtained even when a minimal amount of the second binder is included in the active material layer 30. Thus, a ratio of the binder in the active material layer may be reduced in comparison to a conventional electrode, and as a result, the internal resistance may be reduced.

When the electrode according to the present disclosure include characteristics that satisfy Equation 1, the contact area between the primer layer and the active material in the active material layer may be increased and the structural stability and adhesion may be improved. Additionally, the structural stability and adhesion of the electrode may be maintained at an improved level when the ratio of the binder in the active material layer is reduced and the internal resistance may be reduced. The second dispersant is not limited and may be one commonly used in the art. For example, the second dispersant may include isopropyl alcohol, N-methylpyrrolidone (NMP), acetone, or carboxymethylcellulose or a salt thereof.

As described above, when the electrode according to the present disclosure has characteristics that satisfy Equation 1, the structural stability and adhesion may be improved and the adhesion may be in a range of about 15 gf/15 mm to about 25 gf/15 mm. In the present disclosure, with respect to the adhesion of the electrode, a double-sided tape may be coupled to slide glass, an electrode punched to a size of 15 mm×180 mm may be disposed thereon and may be adhered by repeated compression (e.g., multiple times, 5 times) with a 2 kg roller. Accordingly, a peel force from the slide glass may be measured by pulling (e.g., at 200 mm/min) using a universal testing machine (UTM, TA instruments). In particular, a measurement angle between the slide glass and the electrode may be about 180 degrees (°).

At least one side of the current collector may be coated with a slurry that forms a primer layer and may be dried to form the primer layer. The electrode according to the exemplary embodiment of the present disclosure may then be prepared by coating the primer layer with a slurry for forming an active material layer and drying and rolling the coated current collector. In particular, the slurry that forms a primer layer may include conductive agent A, binder A and dispersant A. The slurry that forms an active material layer may include an active material, a conductive agent B, a binder B and a dispersant B.

The coating may be performed by uniformly dispersing the slurry using a doctor blade. Additionally, the coating may be performed by a method such as die casting, comma coating, screen printing or the like. The drying is not limited, and may be performed in a temperature range of about 50° C. to about 200° C. within a 24 hour duration in a vacuum oven.

The present disclosure provides a lithium secondary battery that includes the electrode. The lithium secondary battery according to an exemplary embodiment of the present disclosure may include a positive electrode, a negative electrode, a separator disposed between the positive electrode and the negative electrode and an electrolyte. The positive electrode and the negative electrode or both may be the above-described electrode. The separator may be a thin insulating film that has high (e.g., increased) ion permeability and mechanical strength and may have a pore diameter of about 0.01 µm to about 10 µm and a thickness of about 5 µm to about 300 µm. A porous polymer film prepared from a polyolefin-based polymer (e.g., an ethylene homopolymer, a propylene homopolymer, an ethylene/butene copolymer, an ethylene/hexene copolymer, and an ethylene/methacrylate copolymer), may be used alone or in a lamination therewith as the separator. Additionally, a porous nonwoven fabric formed of high melting point glass fibers or polyethylene terephthalate fibers may be used, however, the present disclosure is not limited thereto. The electrolyte may include an organic solvent and a lithium or the like. An anion of the lithium salt may include at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(C^F{}_3)_5PF^-$, $(CF_3)_6P^-$, $CF_3SO_2^-$, $(CF_3SO_2)_2N^-$, $(FSO_2)_2N^-$, $CF_3CF_2(CF_3)_2CO^-$, $(CF_3CO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$. Representative examples of the organic solvent may be at least one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxy ethane, diethoxy ethane, vinylene carbonate, sulfolane, γ-butyrolactone, propylene sulfide, and tetrahydrofuran.

In particular, ethylene carbonate and propylene carbonate, ring-type carbonates among the carbonate-based organic solvents, well dissociate a lithium salt in the electrolyte due to high dielectric constants as high-viscosity organic solvents and the ring-type carbonate may be used. An electrolyte solution having high electrical conductivity may be prepared when the ring-type carbonate is mixed with low-viscosity, low-dielectric constant linear carbonate (e.g., dimethyl carbonate and diethyl carbonate) in an appropriate ratio, the ring-type carbonate may be used.

Further, to improve charge or discharge characteristics and flame retardancy, the electrolytemay further include pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride. In some exemplary embodiments, halogen-containing solvents (e.g., carbon tetrachloride and ethylene trifluoride), may be included to impart incombustibility. Additionally, carbon dioxide gas may be included to improve high-temperature storage characteristics and fluoro-ethylene carbonate (FEC), propene sultone (PRS), or fluoro-propylene carbonate (FPC) may be included.

The lithium secondary battery of the present disclosure may be prepared by forming an electrode assembly by disposing the separator between the positive electrode and the negative electrode. The electrode assembly may be disposed in a cylindrical type battery container or a prismatic type battery container. Then the electrolyte may be injected into the container. Additionally, the electrode assemblies may be disposed in a stacked arrangement. The stacked arrangement may be impregnated with the electrolyte and the lithium secondary battery may be prepared by disposing the product obtained in a battery container and sealing the battery container.

The battery container may be selected from a cylindrical type (e.g. a can), a prismatic type, a pouch type, or a coin. Accordingly, the shape of the lithium secondary battery according to the use thereof is not limited. The lithium secondary battery according to the present disclosure may be used in a battery cell that is used as a power source of a small device and may also be used as a unit cell in a medium and large sized battery module that may include a plurality of battery cells. Exemplary embodiments of the medium and large sized device may be an electric vehicle, a hybrid electric vehicle, a plug-in hybrid electric vehicle, or a power storage system, however the medium and large sized device is not limited thereto.

Accordingly, in exemplary embodiments of the present disclosure a contact area between a primer layer and an active material layer may be increased and the structural stability and adhesion may be improved. Further the ratio of a binder in the active material layer may be reduced which in turn, reduces the internal resistance. The lithium secondary battery according to the present disclosure may have excellent discharge capacity characteristics by including the above-described electrode. Thus, the electrode and the lithium secondary battery according to the present disclosure are suitable for the battery industry.

EXAMPLES

Hereinafter, the present disclosure will be described in more detail according to examples. However, the disclosure may be embodied in many different forms and should not be construed as being limited to the embodiments set forth herein. Rather, these example embodiments are provided so that this description will be thorough and complete, and will fully convey the scope of the present disclosure to those skilled in the art. In order to clarify the present disclosure, parts that are not connected with the description will be omitted, and the same elements or equivalents are referred to with the same reference numerals throughout the specification. Also, the size and thickness of each element are arbitrarily shown in the drawings, but the present disclosure is not necessarily limited thereto, and in the drawings, the thickness of layers, films, panels, regions, etc., are exaggerated for clarity.

Example 1

(1) Primer Layer Preparation

The carbon black having an average particle diameter of 0.037 µm and a specific surface area of 58 $m^2/g$, a carboxymethylcellulose ammonium salt and a styrene-butadiene rubber were mixed to prepare a primer slurry for preparing a primer layer. In particular, the carbon black, the carboxymethylcellulose ammonium salt and the styrene-butadiene rubber in the primer slurry were mixed in a weight ratio of 1:0.1:1. Thereafter, one side of a 10 µm thick copper thin film was coated with the primer slurry to a uniform thickness and then dried at 100° C. to prepare a primer layer.

(2) Negative Electrode Preparation

A negative electrode active material layer was formed on the prepared primer layer to prepare a negative electrode. In particular, 95.6 wt % of graphite, 0.75 wt % of carbon black, 1.15 wt % of carboxymethylcellulose, and 2.5 wt % of a styrene-butadiene rubber were mixed to prepare a negative electrode active material slurry. The primer layer was uniformly coated with the slurry, then dried at 100° C., and compressed (e.g., rolled) to prepare a negative electrode.

Example 2

A negative electrode was prepared in the same manner as in Example 1 except that when the negative electrode active material layer was formed 96.6 wt % of graphite, 0.75 wt % of carbon black, 1.15 wt % of carboxymethylcellulose, and 1.5 wt % of a styrene-butadiene rubber were used.

Example 3

A negative electrode was prepared in the same manner as in Example 1 except that during the preparation of the primer layer carbon black, carboxymethylcellulose ammonium salt, and styrene-butadiene rubber were mixed in a weight ratio of 1:0.1:1.5.

Example 4

A negative electrode was prepared in the same manner as in Example 1 except that during the preparation of the primer layer, carbon black having an average particle diameter of 0.037 μm and a specific surface area of 58 m²/g and flaky graphite having an average particle diameter of 6.5 μm and a specific surface area of 10 m²/g were mixed in a weight ratio of 9:1 and used instead of the carbon black as described in Example 1.

Example 5

A negative electrode was prepared in the same manner as in Example 1 except that during the preparation of the primer layer carbon black having an average particle diameter of 0.037 μm and a specific surface area of 58 m²/g and flaky graphite having an average particle diameter of 6.5 μm and a specific surface area of 10 m²/g were mixed in a weight ratio of 8:2 and used instead of the carbon black as described in Example 1.

Comparative Example 1

A negative electrode active material slurry was prepared mixing 96.5 wt % of graphite, 0.75 wt % of carbon black, 1.15 wt % of carboxymethylcellulose, and 1.6 wt % of a styrene-butadiene rubber. A side (e.g., one side) of a 10 μm thick copper thin film was coated with the slurry to a uniform thickness, then dried at 100° C., and compressed (e.g., rolled) to prepare a negative electrode.

Comparative Example 2

A negative electrode was prepared in the same manner as in Example 1 except during the preparation of the primer layer carbon black, carboxymethylcellulose ammonium salt, and styrene-butadiene rubber were mixed in a weight ratio of 1:0.1:0.5.

Comparative Example 3

A negative electrode was prepared in the same manner as in Example 1 except that during the preparation of the primer layer, carbon black, carboxymethylcellulose ammonium salt, and styrene-butadiene rubber were mixed in a weight ratio of 1:0.1:2.5.

Comparative Example 4

A negative electrode was prepared in the same manner as in Example 1 except that during the preparation of the primer layer carbon black having an average particle diameter of 0.048 μm and a specific surface area of 39 m²/g was used instead of the carbon black having an average particle diameter of 0.037 μm and a specific surface area of 58 m²/g.

Comparative Example 5

A negative electrode was prepared in the same manner as in Example 1 except that during the preparation of the primer layer flaky graphite having an average particle diameter of 6.5 μm and a specific surface area of 10 m²/g was used instead of the carbon black as described in Example 1.

Comparative Example 6

A negative electrode was prepared in the same manner as in Example 1 except that during the preparation of the primer layer carbon black having an average particle diameter of 0.037 μm and a specific surface area of 58 m²/g and flaky graphite having an average particle diameter of 6.5 μm and a specific surface area of 10 m²/g were mixed in a weight ratio of 7:3 and used instead of the carbon black as described in Example 1.

Experimental Example 1

Adhesion of each negative electrode prepared in Examples 1 to 5 and Comparative Examples 1 to 6 was comparatively analyzed. Before the adhesion analysis and before the active material layer in each negative electrode was formed, surface roughness of the primer layer (e.g., with respect to Comparative Example 1, the current collector) was measured. The results thereof are presented in Table 1 below.

(1) Surface Roughness ($R_z$) Measurement

A Topo image of a surface of the primer layer or current collector of each negative electrode was obtained by using a NanoView EQCO237 instrument (Optical Profiler, NanoSystem, Korea). In particular, the surface of the primer layer or the current collector was measured at a magnification of 500 times. The Topo image was obtained by selecting 5 measurement areas, the measurements were made within a range of 20 μm above and below a reference plane and linear recovery and triangle recovery were performed. The surface roughness ($R_z$) was calculated by Equation 2 using a sum ($R_p$, absolute value) of distances from the center line to the farthest 5 points in an upward direction and a sum ($R_v$, absolute value) of distances from the center line to the farthest 5 points in a downward direction which were obtained in the Topo image.

$$\text{Surface roughness } (R_z)=(R_p+R_v)/5 \qquad \text{Equation 2}$$

(2) Adhesion Measurement

Figure 3A:
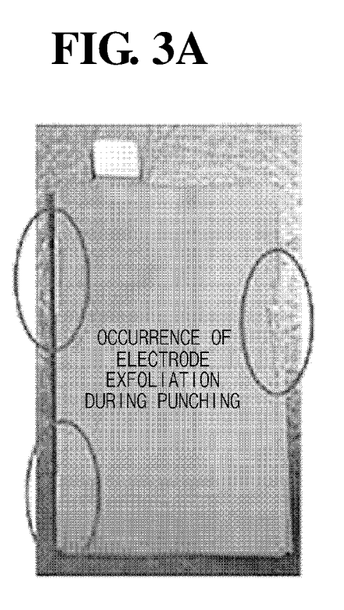
FIG. 3A illustrates an exemplary image of an evaluation criteria of an electrode in which the exfoliation phenomenon occurs according to the exemplary embodiment of the present disclosure.
Figure 3B:
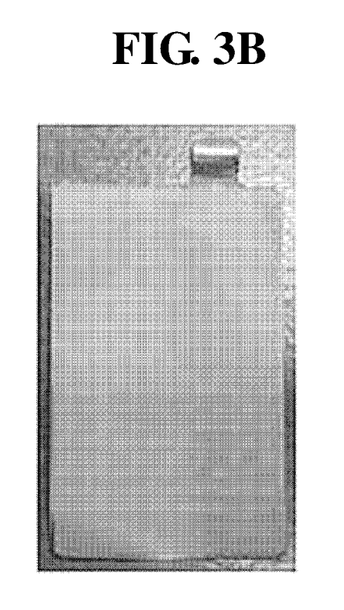
FIG. 3B illustrates an exemplary image of an evaluation criteria of an electrode in which the exfoliation phenomenon does not occur according to the exemplary embodiment of the present disclosure.

The adhesion was measured under dry conditions. Specifically, a double-sided tape was attached to slide glass, an electrode punched to a size of 15 mm×180 mm was disposed thereon and adhered by being compressed (e.g., rubbed 5 times) with a 2 kg roller. A peel force from the slide glass was then measured by pulling at 200 mm/min using a universal testing machine (UTM, TA instruments). In particular, a measurement angle between the slide glass and the electrode was 180 degrees (°). After the adhesion measurement, the sample without an exfoliation phenomenon was evaluated as "○" and the sample, in which the exfoliation phenomenon occurred, was evaluated as "×" by visually checking a state of each electrode (See FIGS. 3A and 3B).

TABLE 1

| Category | Surface roughness ($R_z$, μm) | $R_z - D_{50}/2$ | Adhesion Dry (gf/15 mm) | Evaluation |
|---|---|---|---|---|
| Example 1 | 11.7 | 2.04 | 16 | ○ |
| Example 2 | 11.7 | 2.05 | 15.1 | ○ |
| Example 3 | 8.1 | −1.55 | 16.4 | ○ |
| Example 4 | 8.6 | −1.03 | 17 | ○ |
| Example 5 | 10.4 | 0.72 | 19.2 | ○ |
| Comparative Example 1 | 3.2 | −6.45 | 13.0 | × |
| Comparative Example 2 | 14.4 | 4.71 | 12.0 | × |
| Comparative Example 3 | 4.1 | −5.55 | 6.1 | × |
| Comparative Example 4 | 13.3 | 3.65 | 12.7 | × |
| Comparative Example 5 | 3.9 | −5.75 | 5.1 | × |
| Comparative Example 6 | 28.6 | 18.95 | 4.0 | × |

As illustrated in Table 1, with respect to the negative electrodes of Examples 1 to 5 according to the exemplary embodiment of the present disclosure, values of $R_z-D_{50}/2$ satisfied ±2.2. As a result, it was confirmed that the adhesion was improved in comparison to the negative electrodes of Comparative Examples 1 to 6.

Experimental Example 2

Figure 4:
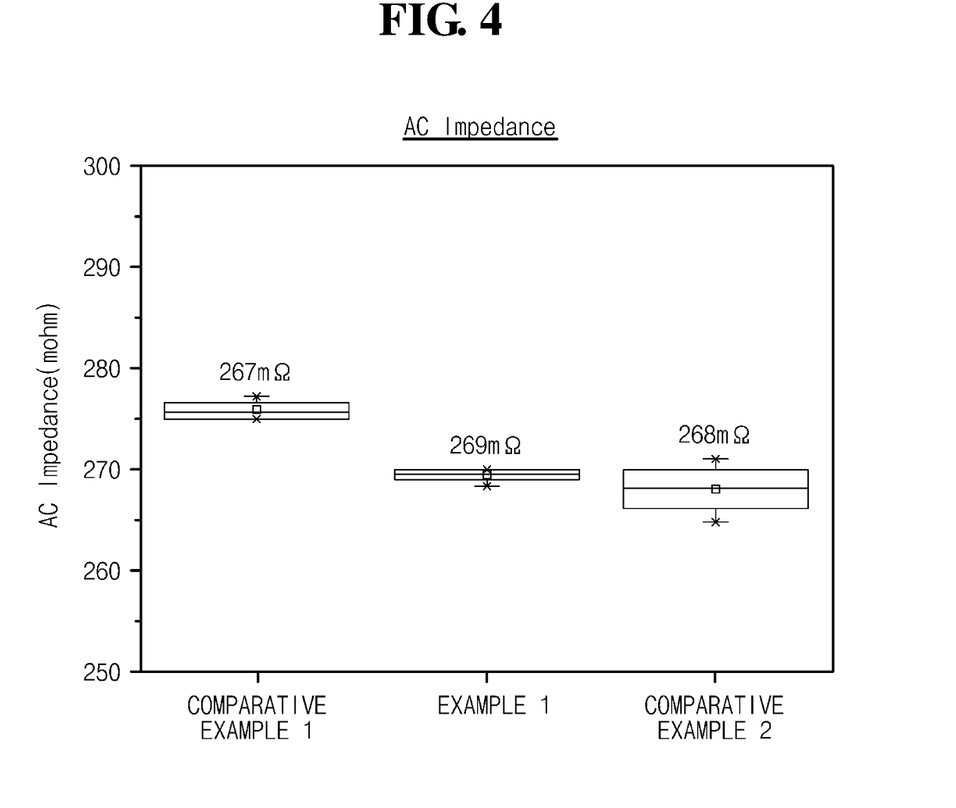
FIG. 4 is an exemplary graph that illustrates measurement results of internal resistance of each monocell including a negative electrode according to an exemplary embodiment of the present disclosure.
Figure 5:
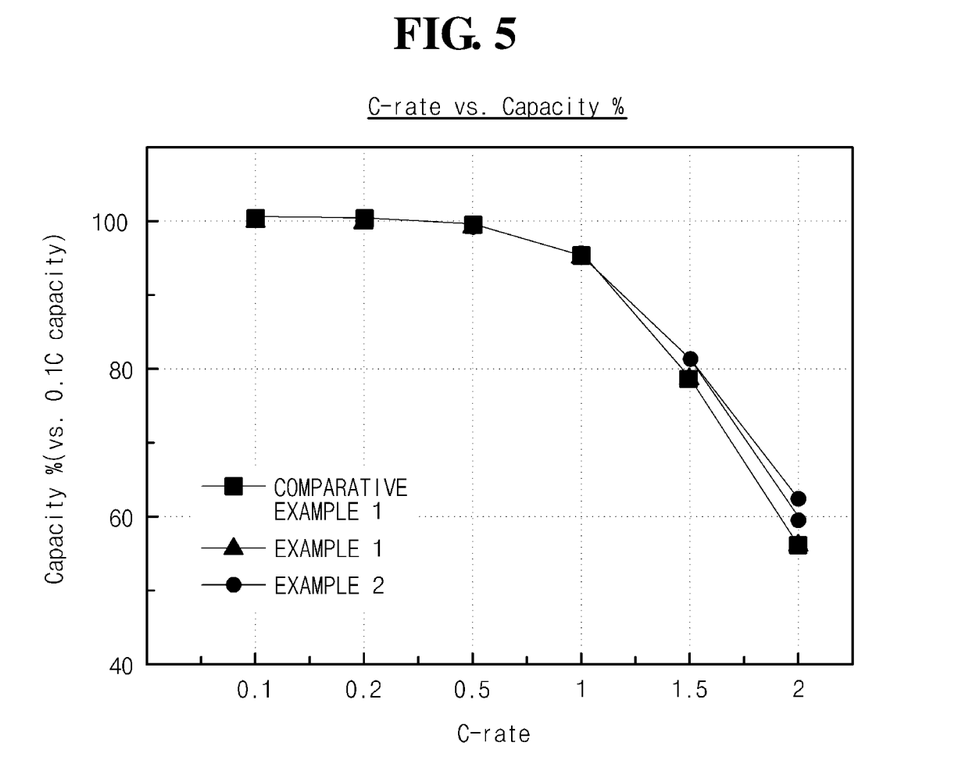
FIG. 5 is an exemplary graph that illustrates measurement results of discharge rate of each monocell including the negative electrode according to the exemplary embodiment of the present disclosure.
Figure 6:
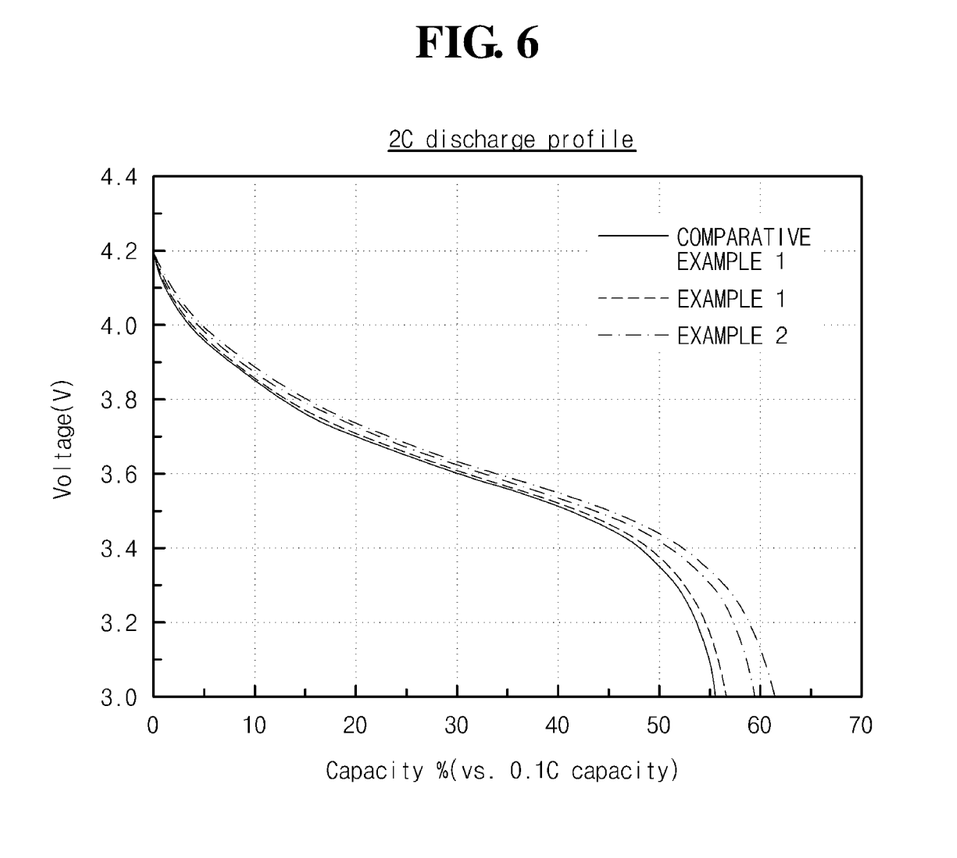
FIG. 6 is an exemplary graph that illustrates measurement results of discharge behavior of each monocell including the negative electrode according to the embodiment of the present disclosure.

Monocells were manufactured by using each negative electrode prepared in Examples 1 and 2 and Comparative Example 1 and internal resistance and discharge capacity characteristics were then measured. The results thereof are presented in Table 2 and FIGS. 4 to 6 below. Lithium metal was used as a positive electrode and a Celgard separator was disposed between the negative electrode and the positive electrode and stacked to prepare an electrode assembly. Thereafter, an electrolyte solution, in which 1 M $LiPF_6$ was dissolved in a mixed solvent (DEC:EC=1:1) of dimethyl carbonate (DEC) and ethylene carbonate (EC), was injected to manufacture each monocell.

(1) Internal Resistance (AC Impedance) Measurement

Internal resistance of each monocell manufactured was measured by using a battery impedance meter (BT3562HIOKI E.E. Corporation). In particular, the internal resistance was a value measured at a voltage of 3.85 V and a frequency of 1 kHz and a low resistance value denotes that contact resistance between the current collector and the active material layer is low.

(2) Discharge Capacity Characteristics Measurement

Each monocell manufactured was charged at a rate of 0.5 C to 4.35 V at 25° C. under a constant current/constant voltage (CC/CV) condition and was then discharged at 0.1 C, 0.2 C, 0.5 C, 1.0 C, 1.5 C, and 2.0 C to 3.0 V under a CC condition to measure discharge capacity.

TABLE 2

| Category | Internal resistance (mΩ) | Discharge rate (%, vs 0.1 C) | | | | |
|---|---|---|---|---|---|---|
| | | 0.2 C | 0.5 C | 1.0 C | 1.5 C | 2.0 C |
| Example 1 | 269 | 99.8 | 99.0 | 94.8 | 78.9 | 56.5 |
| Example 2 | 268 | 99.9 | 99.1 | 95.4 | 81.1 | 60.6 |
| Comparative Example 1 | 276 | 99.8 | 99.0 | 95.1 | 79.0 | 56.3 |

As illustrated in Table 2, with respect to the negative electrodes of Examples 1 and 2 according to the embodiment of the present disclosure, it was confirmed that the internal resistances were reduced and the discharge rates were improved in comparison to the negative electrode of Comparative Example 1. In particular, with respect to the negative electrode of Example 1, the internal resistance was reduced despite the fact that the ratio of the binder in the active material layer was increased in comparison to Comparative Example 1 which was attributed to an increase in the contact area with the active material caused by the primer layer. Additionally, the negative electrode of Example 2 exhibited improved adhesion despite the fact that the ratio of the binder in the active material layer was reduced and efficiency was improved at a high rate discharge of 1.0 C or greater. Further, since the ratio of the active material was increased relative to the reduced ratio of the binder, energy density may be increased.

Although the present disclosure has been described with reference to exemplary shown in the accompanying drawings, it is to be understood that the description is given by way of example only. It will be appreciated by those skilled in the art that various changes and equivalent alternative exemplary embodiments may be made without departing from the scope of the present disclosure. Accordingly, the true scope of the present disclosure should be determined by the following claims.

The invention claimed is:

1. An electrode for a lithium secondary battery, comprising:
   a current collector;
   a primer layer that is formed on one side of the current collector and includes a first conductive agent, a first binder, and a first dispersant; and
   an active material layer that is formed on a side of the primer layer disposed opposite to the current collector and includes an active material,
   wherein a surface roughness of the primer layer that abuts the active material layer is selected to be equal to or greater than $D_{50}/2-2.2$ and equal to or less than $D_{50}/2+2.2$ to increase an adhesion of the active material layer, and
   wherein $D_{50}$ represents an average particle diameter of the active material.

2. The electrode for a lithium secondary battery of claim 1, wherein the primer layer includes:
   the first conductive agent formed by 100 parts by weight,
   the first dispersant formed by 5 parts by weight to 20 parts by weight based on 100 parts by weight of the first conductive agent, and
   the first binder formed by 60 parts by weight to 250 parts by weight based on 100 parts by weight of the first conductive agent.

3. The electrode for a lithium secondary battery of claim 1, wherein the primer layer includes:
   the first conductive agent formed by 100 parts by weight,
   the first dispersant formed by 5 parts by weight to 15 parts by weight based on 100 parts by weight of the first conductive agent, and the first binder formed by 60 parts by weight to 180 parts by weight based on 100 parts by weight of the first conductive agent.

4. The electrode for a lithium secondary battery of claim 1, wherein the first conductive agent is a mixture of a flaky graphite having a particle diameter of about 6.3 μm to about 6.5 μm and a specific surface area of about 8.5 $m^2$/g to about 10 $m^2$/g and a carbon black.

5. The electrode for a lithium secondary battery of claim 4, wherein the mixture includes the carbon black and the flaky graphite in a weight ratio of about 8:2 to about 9:1.

6. The electrode for a lithium secondary battery of claim 1, wherein the first dispersant includes carboxymethylcellulose, a carboxymethylcellulose salt, or both.

7. The electrode for a lithium secondary battery of claim 6, wherein the carboxymethylcellulose salt includes a carboxymethylcellulose ammonium salt, a carboxymethylcellulose sodium salt, or both.

8. The electrode for a lithium secondary battery of claim 1, wherein the primer layer has a thickness of about 0.5 μm to about 1 μm.

9. The electrode for a lithium secondary battery of claim 1, wherein the electrode has an adhesion of about 15 gf/15 mm to about 25 gf/15 mm.

10. A lithium secondary battery comprising:
a positive electrode;
a negative electrode;
a separator disposed between the positive electrode and the negative electrode; and
an electrolyte,
wherein the positive electrode, the negative electrode, or both are the electrode of claim 1.

11. The electrode for a lithium secondary battery of claim 1, wherein the first conductive agent is a carbon black having a particle diameter in the range of about 0.037 μm to about 0.045 μm and a specific surface area of about 53 $m^2$/g to about 58 $m^2$/g.

* * * * *